2,853,359

Patented Sept. 23, 1958

2,853,359

OXIDATION COLOURING MATTERS

Robert Frederic Michel Sureau, Enghien-les-Bains, and Pierre Marie-Joseph Obellianne, Soisy sous Montmorency, France, assignors to Compagnie Francaise des Matieres, Paris, France, a French body corporate No Drawing. Application June 29, 1955
Serial No. 518,938

Claims priority, application France June 30, 1954

3 Claims. (Cl. 8—32)

The present invention concerns improvements in and relating to oxidation colouring matters.

The use of sulphamic acids and of sulphamates derived from mono-, di- and tri-amines for the formation of oxidation colouring matters on fibres or any other support has been described in French Patent 820,395 and in the co-pending patent application Serial Nos. 322,358 of November 24, 1952 now Patent No. 2,783,121, and 404,-792 of January 18, 1954.

It has now been found, however, that oxidation colouring matters can be produced by the oxidation of certain sulphamic acids and sulphamates derived from aromatic tetramines; these acids are triamino-benzene monosulphamic acid, diamino-benzene disulphamic acid, monoamino-benzene trisulphamic acid, triamino-diphenyl monosulphamic acid, diamino-diphenyl disulphamic acid and monoamino-diphenyl trisulphamic acid; the salts which are utilisable are the salts of these acids and the alkali or alkaline earth metals or the salts of these acids with nitrogenous bases.

These compounds can be prepared by sulphonation on one or more $NH_2$ groups of the derivatives of the general formulae:

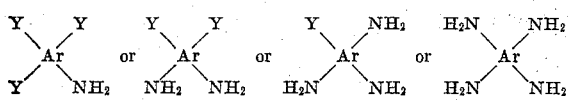

in which Ar represents the residue of a benzene or diphenyl radical, and Y represents a nitro group or another group capable of being converted into an amino group, such as an acylamino group, and by conversion into amino groups of the Y group or groups present in the products resulting from this sulphonation.

The sulphonation on the amino groups may be effected by means of a sulphonating agent such as, for example, chlorsulphonic acid, sulphuric anhydride, oleum, sulphuric acid, sulphamic acid, or compounds of sulphuric anhydride with a tertiary amine, an amide or an ether. As examples of tertiary amines capable of entering into the foregoing combinations there may be mentioned pyridine and its mono- or di-methyl derivatives trimethylamine, triethylamine, ethylmorpholine and dimethylcyclohexylamine; as an example of an amide there may be mentioned dimethylformamide, and as an example of an ether there may be mentioned dioxan. The reaction medium may consist of an excess of the tertiary amine, amide or ether used, acting as solvent, or possibly of a mixture of two or more of these compounds. After sulphonation, the Y group or groups is or are converted into an amino group or groups by any of the known processes which are carried out in neutral or alkaline medium.

The sulphamic acids so obtained can be isolated as the free acids, as alkali metal salts or alkaline earth metal salts, or as salts with nitrogenous bases. The free acids are not very soluble in water; the salts are generally very soluble and occur in the form of greyish white or slightly brownish crystals. They are particularly well adapted for the preparation of oxidation colouring matters which possess excellent fastness, especially to washing.

These oxidation colouring matters are preferably prepared on fibres according to known processes described in particular in the patents and patent applications mentioned above. One of the most suitable methods of application consists, for example, in applying by printing on the fibres a paste mixed to an adequate thickness, formed from a solution of a mixture of the sulphamate, an oxidising agent, a product producing an acid, and a slight excess of a volatile base, and if desired an oxidation catalyst, drying the print obtained and exposing it for some minutes to neutral steam from boiling water.

Among the oxidising agents which can be used for the accomplishment of this process there may be given as examples, chromates, bichromates, nitrites, chlorates, hydrogen peroxide and salts capable of producing it. Copper and vanadium salts, as well as the salts of vanadic acid, and the ferrocyanides may be used as oxidation catalysts. The substances which generate an acid on vaporisation may be salts of volatile bases such as ammonia, or the amides or esters of organic acids.

The invention will be more clearly understood by reference to the following examples which are purely illustrative and in which the parts indicated are parts by weight.

EXAMPLE 1

350 parts of chlorsulphonic acid are slowly introduced into 1100 parts of well mixed α-picoline without the temperature exceeding 30° C., and then 274 parts of 3:3′-dinitro-4:4′-diaminodiphenyl are added all at once. The temperature rises to 35–40° C. The apparatus being shielded from moisture, the temperature is taken to 50° C. over an hour, the mixture is then allowed to cool for two hours, and the sulphonation product is poured into a well agitated solution of 400 parts of sodium carbonate in 1000 parts of water. After verifying that the solution obtained is indeed alkaline, the α-picoline is driven off by distillation with steam. On cooling, the disodium salt of 3:3′-dinitro-4:4′-disulphamino-diphenyl crystallises in the form of light yellow crystals.

This compound is introduced in portions into the following mixture which is first boiled for some moments: 420 parts of iron filings, 2500 parts of water and 100 parts of glacial acetic acid. The product is then maintained at the boiling point for an hour with good agitation: it is then made alkaline by the addition of sodium carbonate and filtered while boiling. On cooling and adding 100 parts of sodium chloride, the disodium salt of 3:3′-diamino-4:4′-disulphamino-diphenyl is precipitated as a beige, crystalline powder, which is filtered and dried in vacuum. This sodium disulphamate is not very soluble in cold water.

On replacing the sodium carbonate employed in the alkalinization by potassium carbonate or calcium carbonate, the disulphamates of potassium and calcium are obtained in the same manner. This last salt is much more soluble than the sodium and potassium salts. On treating the calcium salt with ammonium sulphate in hot aqueous solution, filtering the precipitate of calcium sulphate formed, and concentrating the filtrate, crystals of the ammonium disulphamate having properties analogous to those of the sodium and potassium disulphamates are obtained.

Analysis of the disodium salt $$\text{NaO}_3\text{SHN}-\underset{\text{NH}_2}{\bigcirc}-\underset{\text{NH}_2}{\bigcirc}-\text{NHSO}_3\text{Na}, \text{H}_2\text{O}$$

|  | Calculated for $C_{12}H_{14}O_7N_4S_2Na_2$ | Found |
|---|---|---|
| N, percent | 12.83 | 12.65 |
| S, percent | 14.67 | 14.83 |
| H₂O, percent | 4.12 | 4.80 (90° vacuum) |

EXAMPLE 2

40 parts of the disodium salt of 3:3′-diamino-4:4′-disulphamino-diphenyl, 20 parts of sodium chlorate, 30 parts of ammonium oxalate, 20 parts of a 1% solution of ammonium vanadate, 10 parts of 20% ammonia, and 880 parts of thickening agent based on starch-tragacanth, are made into a paste.

The paste which is made homogeneous is sifted and printed on cotton cloth, after drying and neutral steaming at 100° C. for 8 minutes, the cloth is washed in a bath containing 3 parts per 1000 of sodium carbonate and 3 parts per 1000 of Marseilles soap. The shade obtained is a strong yellow brown possessing excellent fastness, particularly to light and washing.

EXAMPLE 3

8 parts of chlorsulphonic acid, and then 5 parts of 4:6-dinitro-1:3-diaminobenzene are slowly introduced into 25 parts of well stirred α-picoline, without exceeding a temperature of 30° C. The mixture is brought to 40° C. over 10 minutes, and is then allowed to mix for one hour at atmospheric temperature. The mass is poured into a solution of 10 parts of sodium carbonate in 30 parts of water, the alkalinity is verified, and the α-picoline is distilled with steam. The disodium salt of 4:6-dinitro-1:3-disulphamino-benzene crystallises on cooling. The latter is filtered and introduced in portions into a mixture, first boiled for some moments, comprising: 10 parts of iron filings, 4 parts of acetic acid, and 25 parts of water. The resulting mixture is heated for an hour at boiling point, made alkaline by the addition of sodium carbonate and filtered while hot. The filtrate is concentrated on a water bath until the disodium salt of 4:6-diamino-1:3-disulphamino-benzene is precipitated. This appears in the form of a beige, crystalline powder which is very soluble in water.

For analysis, the product was purified by recrystallisation from a mixture of water and alcohol.

|  | Calculated for $C_6H_8O_6N_4S_2Na_2$ | Found |
|---|---|---|
| C, percent | 21.05 | 21.72 |
| H, percent | 2.6 | 3.10 |
| N, percent | 16.37 | 15.72 |
| S, percent | 18.71 | 19.50 |

EXAMPLE 4

A homogeneous paste is prepared from:
70 parts of the disodium salt of 4:6-diamino-1:3-disulphamino-benzene,
40 parts of ammonium chloride,
20 parts of sodium chlorate,
20 parts of 1% ammonium vanadate,
10 parts of 20% ammonia, and
840 parts of thickening agent based on starch-tragacanth.

The homogeneous paste is sifted and printed on cotton cloth. The print, dried and developed for 10 minutes in neutral steam at 100° C., gives a yellow-brown shade with good fastness to light.

We claim:
1. The disodium salt of 3:3′-diamino-4:4′-disulphamino-diphenyl.
2. Process for the preparation of colouring matters on fibres which comprises oxidising on the fibres the disodium salt of 3:3′-diamino-4:4′-disulphamino-diphenyl.
3. Fibres coloured by means of the oxidation product of the disodium salt of 3:3′-diamino-4:4′-disulphamino-diphenyl.

References Cited in the file of this patent

FOREIGN PATENTS

| 498,755 | Great Britain | Jan. 9, 1939 |
| 1,045,530 | France | June 24, 1953 |
| 1,060,667 | France | Nov. 18, 1953 |
| 1,065,392 | France | Jan. 6, 1954 |

OTHER REFERENCES

Richter's "Organic Chemistry," transl. by D'Albe, pub. 1922, by P. Blakiston's Son and Co., Phila., Pa., vol. 2, p. 118.

UNITED STATES PATENT OFFICE

CERTIFICATE OF CORRECTION

Patent No. 2,853,359 — September 23, 1958

Robert Frederic Michel Sureau et al.

It is hereby certified that error appears in the above numbered patent requiring correction and that the said Letters Patent should read as corrected below.

In the grant, lines 3 and 4, and line 13, and in the heading to the printed specification, lines 5 and 6, name of assignee, for "Compagnie Francaise des Matieres", in each occurrence, read -- Compagnie Francaise des Matieres Colorantes --.

Signed and sealed this 2nd day of December 1958.

(SEAL)
Attest:
KARL H. AXLINE
Attesting Officer

ROBERT C. WATSON
Commissioner of Patents